Dec. 26, 1967 R. B. BARBER 3,359,708
GAS AND LIQUID SEPARATING APPARATUS
Filed July 15, 1966
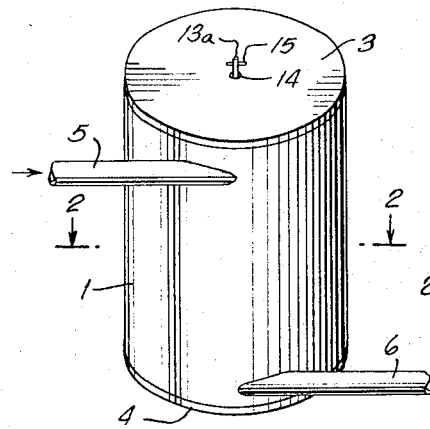
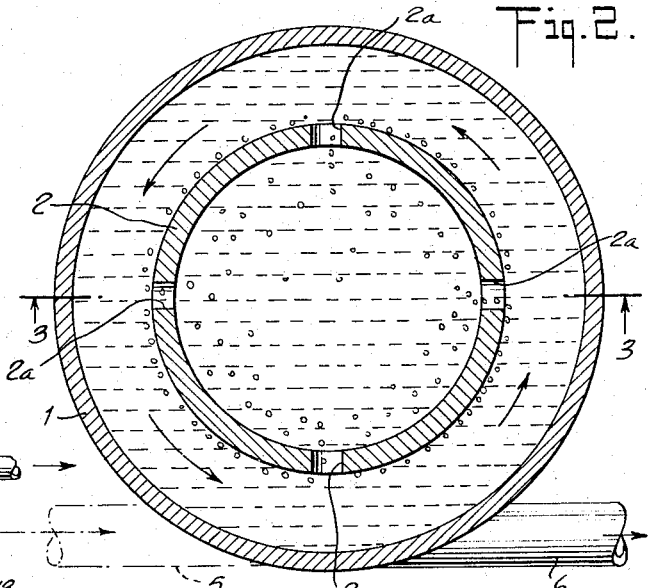
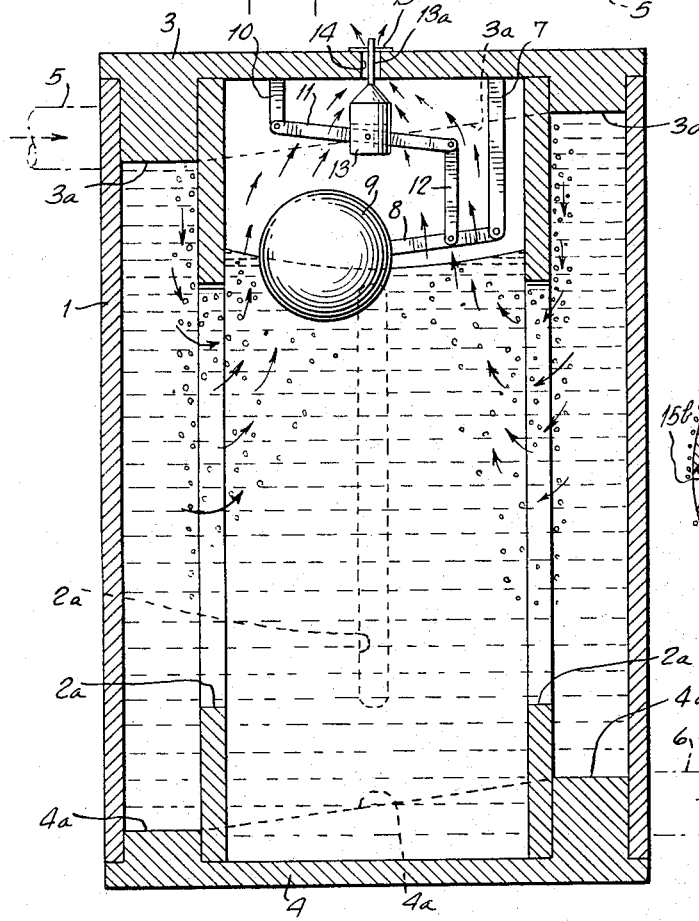
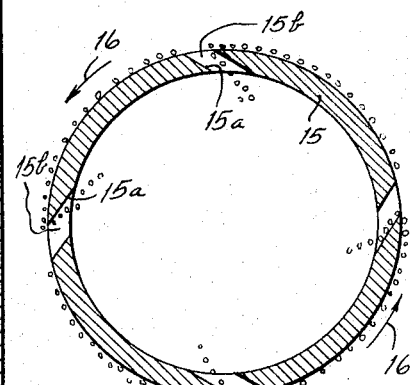
INVENTOR.
RONALD B. BARBER
BY Lester W. Clark
ATTORNEY

United States Patent Office 3,359,708
Patented Dec. 26, 1967

3,359,708
GAS AND LIQUID SEPARATING APPARATUS
Ronald B. Barber, Cheshire, Conn., assignor to Neptune Meter Company, Wallingford, Conn., a corporation of New Jersey
Filed July 15, 1966, Ser. No. 565,582
7 Claims. (Cl. 55—170)

ABSTRACT OF THE DISCLOSURE

A gas-liquid separation apparatus comprising two concentric cylinders closed at top and bottom ends with tangential feed and discharge means through the outer cylinder and guides for smooth, helical flow within outer cylinder and large, vertical, slotted openings through the wall of inner cylinder permitting passage of fluids therethrough for collection of gases above a predetermined liquid level and release of same through a float-controlled valve in the top of the inner cylinder.

---

This invention relates to apparatus for separating gas and liquid components in a flowing stream of fluid. It is particularly intended to separate gases or vapors from a fluid stream approaching a positive displacement meter since the presence of such gases or vapors might cause an inaccurate reading of the meter.

Conventional gas and liquid separators of the so-called vortex type have a cylindrical casing with a tangential fluid inlet at the top of the casing and a tangential fluid outlet at the bottom. The location and directions of the inlet and outlet cause the fluid to flow through the casing along a helical path around the outside wall of the casing, so that gaseous or vaporous components entrained with the entering fluid tend to move toward the center of the casing. The center of the casing is provided with some apparatus, typically a cylindrical screen, which allows the gas to pass through. The upper end of the cylindrical screen communicates with an outlet through which the collected gases may flow.

It has been found that the vortex separators of the prior art are commonly not completely effective to remove the gas or vapor components, because some of the gas bubbles do not pass through the screen but are carried along with the stream of liquid and pass out through the liquid outlet.

It is an object of the present invention to provide a vortex separator in which the openings for the passage of gas are very large as compared to the size of the gas or vapor bubbles encountered, so that the openings do not restrict the flow of gas.

A further object is to provide a gas and liquid separator in which the gas outlet is provided with a float controlled valve so that liquid cannot pass through the gas outlet.

A further object is to provide an improved vortex separator in which the gas collecting openings are arranged to permit the passage of gas to the center of the separator.

The foregoing objects are attained in the apparatus described herein, which comprises two concentric cylinders extending vertically and closed at their ends by top and bottom plates. A tangential inlet is provided near the upper end of the chamber between two cylinders and a tangential outlet is provided near the lower end of that chamber. The inner cylinder is provided with a plurality of elongated vertically extending slots. In one modification, the center lines of the slots are radial, and the sides of each slot are parallel to its center lines. In another modification, the slots are formed so that their upstream sides form acute dihedral angles with the outer surface of the inner cylinder. The radial distance between the cylinders is made short as compared to the radius of the inner cylinder, so as to promote the vortex action and to increase the centrifugal force acting on the liquid. It is preferred to make the ratio of the outer diameter of the inner cylinder to the inner diameter of the outer cylinder equal to at least about 0.75. The end plates support ramps extending into the chamber between the cylinder so as to guide the entering and leaving fluid along a helical path. The central portion of the upper end plate is provided with an exit port for the gas and supports a valve cooperating with the port to open and close it, and a float mechanism for operating the valve.

Other objects and advantages of the invention will become apparent from a consideration of the following specification, claims and drawing.

In the drawing:

FIG. 1 is a perspective view of a separating apparatus embodying the invention;

FIG. 2 is a horizontal cross-sectional view, taken on the line 2—2 of FIG. 1, on a somewhat enlarged scale;

FIG. 3 is a vertical sectional view taken on line 3—3 of FIG. 2; and

FIG. 4 is a fragmentary view, similar to a portion of FIG. 2, showing a modified form of inner cylinder.

The separator illustrated includes an outer cylinder 1, a concentric inner cylinder 2, a top end plate 3 and a bottom end plate 4. An inlet 5 enters the chamber defined between the inner and outer cylinders near the upper end of that chamber, as best seen in FIG. 1. A corresponding tangential outlet 6 extends from that chamber near the bottom thereof.

The upper end plate 3 is provided with a downwardly projecting helical ramp 3a, which fits into the end of the chamber between the two cylinders, and which guides the fluid entering from the inlet 5 along a helical path which advances down the chamber as it passes around the chamber. A similar ramp 4a extends upwardly from the bottom plate 4 and between the inner and outer cylinders. The ramp 4a serves to guide the fluid approaching the outlet 6 toward that outlet. Both ramps tend to eliminate turbulence of the passing fluid at the inlet and outlet. The outlet ramp 4a may be eliminated in many cases.

The inner cylinder 2 is provided with a plurality of vertically extending slots 2a. Although these slots are shown in FIGS. 2 and 3 as extending straight in the vertical direction, they could be made helical or have some other contour as long as they have a substantial vertical extent.

A rod 7 is attached by suitable means to the under surface of the top plate 3 inside the cylinder 2, and extends downwardly from the plate 3. An arm 8 is pivoted on the bottom end of the rod 7 and supports a float 9. A second rod 10 is attached by suitable means to the under surface of the top plate 3 and extends downwardly therefrom. A link 11 is pivoted on the lower end of rod 10 and extends horizontally therefrom. The opposite end of link 11 is pivotally connected to the upper end of another link 12, whose lower end is pivoted on the arm 8.

A valve 13 is pivotally connected to the middle of the link 11, and cooperates with a port 14 in the center of the top plate 3.

The tops of the slots 2a are preferably below the level of the liquid inside the inner cylinder 2, when the valve 13 is fully open.

The tops of the slots 2a are so located that the valve 13 may be opened fully by the float, while the liquid level remains above the tops of the slots.

Valve 13 has a stem 13a which extends through port 14. Outside the port, a pin 15, longer than the width of the port, extends through stem 13a and is effective to limit its opening movement.

In order to reduce the radial distance through which a gas bubble has to travel before it is collected by passing through one of the slots 2a, it is desirable to reduce the radial distance between the outer and inner cylinders and to make it short as compared to the radius of the outer surface of the inner cylinder. I have found that for most purposes, the ratio of the radius of the outer surface of the inner cylinder to the radius of the inner surface of the outer cylinder should be at least about 0.75.

Operation

Fluid entering the inlet 5 may comprise a mixture of liquid and gaseous components. The terms "gaseous components" or "gas" as used in this specification are intended to include vapors, and particularly the vapor phases of the liquid components. As the fluid moves through the chamber between the inner and outer cylinders, traversing a helical path, the centrifugal force acts differentially on the liquid and on the gas components, due to the lower density of the gas components. Consequently, the liquid components tend to gather along the inner surface of the outer cylinder 1 whereas the gaseous components gather along the outer surface of the inner cylinder. As the gaseous components pass the slots 2a, they tend to be forced through those slots, since the pressure inside the cylinder 2 is lower than the pressure outside that cylinder, due to the fact that the rotary movement of the liquid in the separator is communicated through the slots to the liquid inside the cylinder. Consequently, there is always an action of centrifugal force tending to move the liquid components into the chamber between the two cylinders and tending to move the gas components to the interior of the inner cylinder.

As gas accumulates at the top of the space within the inner cylinder 2, the liquid level in that cylinder drops. The float 9 follows the level down, opening the valve 13 and allowing the accumulated gas to escape through the port 14. As soon as enough gas has escaped to allow the liquid level to rise again, the valve 13 again engages its seat at the opening of the port 14.

The elongated slots 2a are large enough so that all bubbles of gas can freely pass through them and hence do not tend to hang up at the slot entrances or to be carried past the slot entrances by the liquid. Of course, the liquid can also pass freely through the large slots. In order to prevent discharge of the liquid, a float operated valve is necessary at the top of the inner chamber. Without the valve, some of the liquid might possibly pass out through the port 14.

Note that apparatus constructed in accordance with the invention provides a turbulence free surface of substantial area (the outside of the inner cylinder) on which the gas may collect, and that the interior of the inner cylinder provides a substantial volume free of turbulence, in which the gas may rise to a free surface. Both the turbulence free collecting surface and the turbulence free volume are necessary to the proper operation of the apparatus. To that end, the slots 2a should be widely separated, and the radius of the inner cylinder should be substantial.

FIG. 4

This figure illustrates at 15 a modified form of inner cylinder which may be used in place of the cylinder 2 of FIGS. 2 and 3. In the cylinder 15, the slots 15a are formed so that one side of each slot makes an acute angle as shown at 15b with the upstream edge of the outer surface of the cylinder 15. It has been found that the existence of such an acute angle adjacent the path of the moving fluid, which is moving in the direction of the arrows 16, tends to develop a region of low pressure immediately in the lee of the slot edge. Thus, a bubble approaching one of the edges 15b is subjected, at the moment of passing the slot edge, to a substantial pressure differential tending to force it inwardly past the acute angle into the slot, from whence it is carried into the interior of the cylinder 15.

While the radial slots as illustrated at 2a in FIG. 2 are adequate for almost all mixtures of liquid and gaseous components, the acutely angled slots 15a are capable of effecting a more complete separation, and may be used in particularly difficult situations, as where there is relatively little difference in density between the gaseous and liquid components to be separated.

While I have shown and described certain preferred embodiments of my invention, other modifications thereof will readily occur to those skilled in the art, and I therefore intend my invention to be limited only by the appended claims.

I claim:
1. Apparatus for separating gas and liquid, comprising:
   (a) inner and outer, vertically extending, concentric cylinders;
   (b) means closing the ends of the cylinders and cooperating with the cylinders to define between them a chamber of annular cross-section;
   (c) means defining a tangentially extending inlet for fluid at one end of said chamber;
   (d) means for defining a tangentially extending outlet for liquid at the other end of said chamber;
   (e) said inlet and said outlet cooperating to direct liquid entering the inlet along a helical path through the chamber and adjacent said outer cylinder;
   (f) said inner cylinder having spaced apertures to permit the passage of fluid therethrough and into the interior to establish a liquid level therein, said spaced apertures being slots extending vertically substantially from the bottom of said inner cylinder to a point just below the predetermined liquid level established by the below-mentioned valve and float;
   (g) means in said end closing means defining an upwardly opening outlet port for gas at the top of the inner cylinder;
   (h) a valve controlling the flow through said gas outlet;
   (i) a float in said inner cylinder and operated in response to the liquid level therein; and
   (j) means operatively connecting the float to the valve for closing the valve when the liquid rises above a predetermined level.

2. Apparatus as defined in claim 1, in which said slots have parallel vertically extending sides and have center planes extending radially with respect to said inner cylinder.

3. Apparatus as defined in claim 1, in which said slots have parallel sides, one of which makes an acute dihedral angle with the outer surface of the inner cylinder on the upstream edge of the slot.

4. Apparatus as defined in claim 1, in which the radial distance between the outer surface of the inner cylinder and the inner surface of the outer cylinder is short as compared to the radius of the outer surface of the inner cylinder.

5. Apparatus as defined in claim 1, including a helical ramp at the upper end of the chamber to guide fluid entering said chamber from said tangentially extending inlet along a helical path toward the lower end of the chamber.

6. Apparatus as defined in claim 5, including a second helical ramp at the lower end of the chamber to guide liquid approaching said outlet along a helical path.

7. Apparatus as defined in claim 6, in which said means closing the ends of the cylinders comprises two parallel plates, the lower ramp is fixed on the lower plate, the upper ramp is fixed on the upper plate, and said outlet port, said valve and the float mechanism for operating the valve are mounted on the upper plate within the inner cylinder.

References Cited
UNITED STATES PATENTS

| | | | |
|---|---|---|---|
| 2,228,401 | 1/1941 | Pressler | 55—170 |
| 2,313,773 | 3/1941 | Samiran | 55—170 |
| 2,434,596 | 1/1948 | Spieth | 55—205 X |
| 2,960,184 | 11/1960 | Deitlhauser | 55—456 X |
| 2,993,480 | 7/1961 | Huet | 55—456 X |
| 3,161,490 | 12/1964 | Dudek | 55—205 |

REUBEN FRIEDMAN, *Primary Examiner.*

R. W. BURKS, *Assistant Examiner.*